R. W. LESLEY & H. S. SPACKMAN.
PROCESS OF MAKING CEMENT.
APPLICATION FILED OCT. 4, 1906.
929,145.
Patented July 27, 1909.
2 SHEETS—SHEET 2.
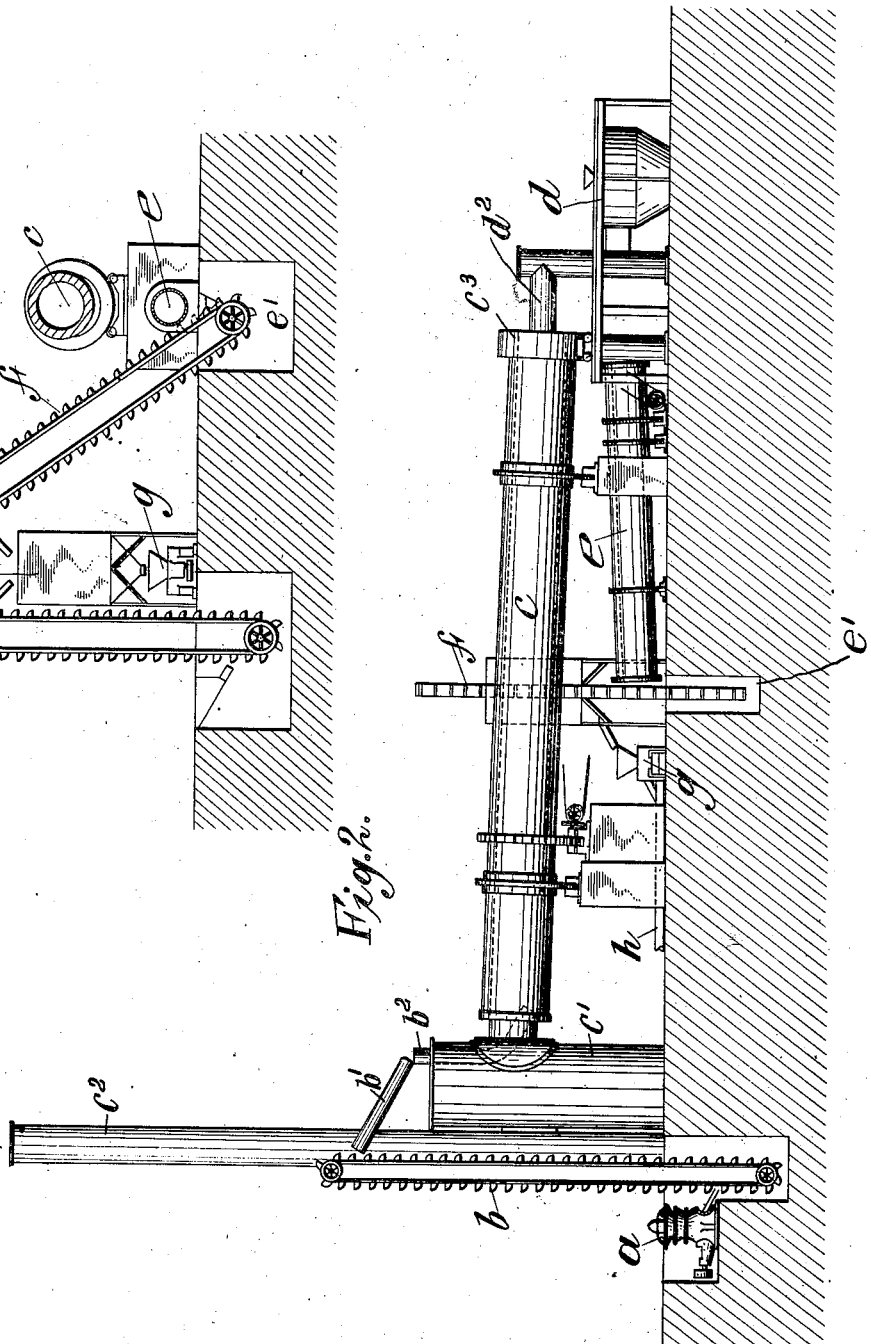
Witnesses
Inventors
Robert W. Lesley and Henry S. Spackman
By their Attorneys
Redding, Kiddle & Greeley

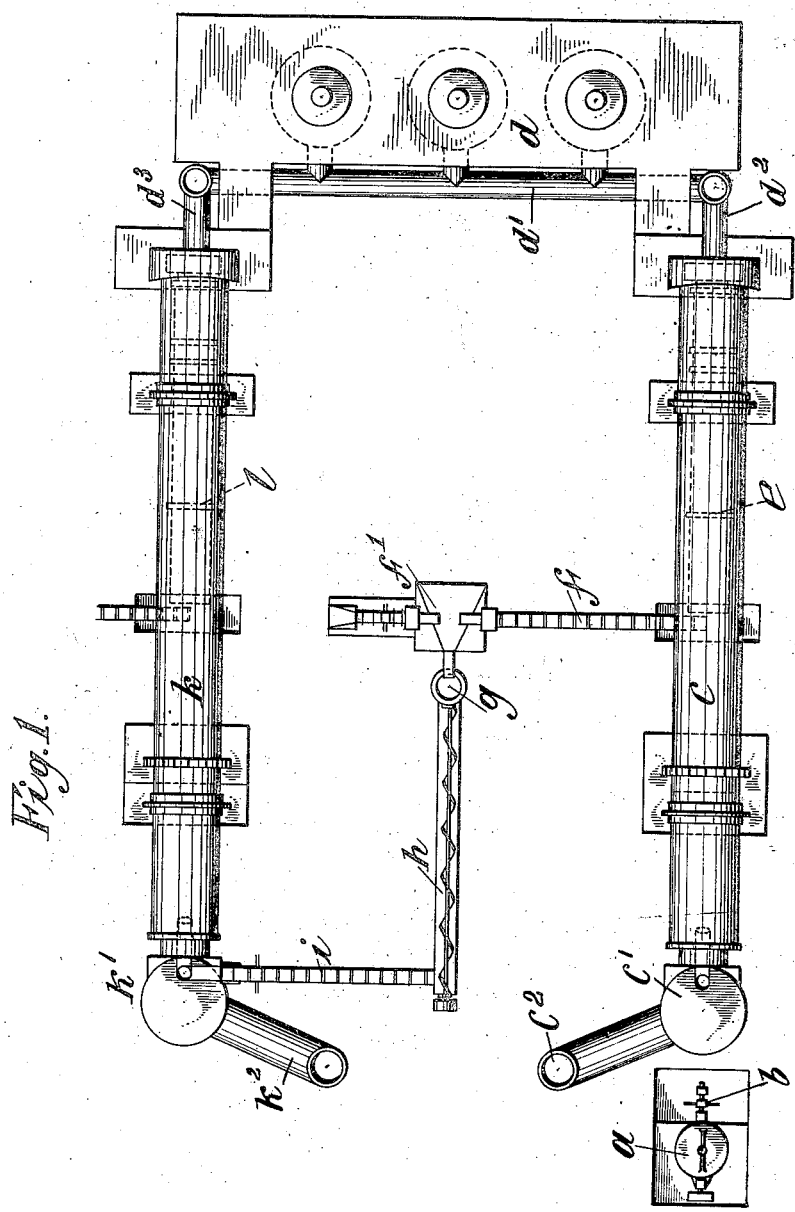

UNITED STATES PATENT OFFICE.

ROBERT W. LESLEY, OF HAVERFORD, AND HENRY S. SPACKMAN, OF ARDMORE, PENNSYLVANIA, ASSIGNORS TO PINE STREET PATENTS COMPANY, A CORPORATION OF NEW JERSEY.

PROCESS OF MAKING CEMENT.

No. 929,145.       Specification of Letters Patent.       Patented July 27, 1909.

Application filed October 4, 1906. Serial No. 337,347.

*To all whom it may concern:*

Be it known that we, ROBERT W. LESLEY, residing at Haverford, Pennsylvania, and HENRY S. SPACKMAN, residing at Ardmore, Pennsylvania, both citizens of the United States, have invented certain new and useful Improvements in Processes of Making Cement, of which the following is a specification, reference being had to the accompanying drawings, forming a part hereof.

In the manufacture of Portland and other commercial cements, the raw materials which may be mixtures of clay or slate with limestone, marl, etc., or may be cement rock, with or without admixtures of limestone, slate, etc., are first dried and then ground to a flour-like fineness, say so that 90 per cent. will pass through a hundred mesh sieve. This fine material, in the practice usual in this country is then passed downward through a rotary inclined kiln as a traveling stream against a current of flame and flame gases coming from flame-producing means in the mouth of the kiln whereby the material is calcined, or freed from carbonic acid gas (carbon dioxid) and is then brought to incipient vitrification or clinkering. The clinker produced is finally ground to an impalpable powder to form ordinary commercial cement.

The crushing and pulverizing of the raw materials require extensive machines and the expenditure of a great amount of power. Moreover, about one-third of the weight and bulk of the raw materials is made up of carbonic acid gas and moisture which are eliminated in the calcining stage. The useless weight and bulk must be handled through all the stages of treatment up to the actual clinkering. The great amount of power consumed in handling so much unnecessary weight and in pulverizing the raw materials which are then in their hardest condition, forms a large feature in the cost of producing cement. Hard, dense limestones and cement rocks are usually preferred because of their density since they occupy less space in the kiln and render a larger output possible; and these hard rocks are of course expensive to comminute to a flourlike fineness by dry-grinding methods.

It has been proposed to calcine or partially calcine the raw materials in a vertical kiln, driving off the carbonic acid gas and the moisture and rendering the further reduction of the materials easier, then to grind to powder and treat in a rotary kiln and finally to pulverize the clinker as usual, but the process as carried out with a vertical kiln is not and cannot be continuous, involving practically a double manufacturing process and moreover the expenditure of time and labor involved in the use of a vertical kiln is so great as to prohibit the commercial manufacture of cement by this double process.

Fine grinding at some stage in the operation is required to insure that in the clinkering stage the cement-forming ingredients shall be uniformly and thoroughly admixed in the form of excessively fine powders. Since in the clinkering the fusion or sintering is not allowed to go very far, the reaction of these bodies on each other is largely superficial and if a particle of clay or lime, for instance, be comparatively coarse it will only be converted superficially, retaining a core of unconverted material. It is therefore absolutely necessary that in clinkering the clinker-making bodies shall be presented to each other in the form of intimately and homogeneously admixed, impalpably fine powders. But it is not necessary that this fine-grinding be performed on the raw materials prior to their entrance into the kiln system; it is, on the other hand, desirable that this grinding be postponed to an intermediate stage of the operation after the materials have lost their original hardness.

It is the object of this invention to improve the process of manufacturing cement so that the manufacture can be carried on as a continuous process without intermission from beginning to end and without requiring the manual handling of materials at any stage, and by a method which shall enable much of the heavy and expensive crushing and grinding machinery to be dispensed with, and shall permit much or all of the unnecessary weight of carbonic acid gas and moisture to be eliminated at an early stage in the process of manufacture, thereby enabling the treatment of much more material per time unit in a given kiln. There is a maximum thickness of the layer of traveling material which can be passed through a rotary kiln and with a material thus calcined the output of clinker is increased.

In accordance with the invention, the raw material, whether limestone or cement rock or a mixture of both, is first crushed coarsely, is then immediately and progressively calcined to a degree sufficient to drive off carbonic acid gas and moisture, thereby rendering the material softer, porous and friable, is reduced to powder, and finally is further heated to a degree sufficient to effect combination of the constituents or clinkering, all in a continuous and progressive process, each stage directly succeeding another upon the cement material without intermission. The cement clinker which is produced by the process may be pulverized immediately or stored as clinker to be pulverized later.

The invention will be more fully explained hereinafter with reference to the accompanying drawings, in which is shown an apparatus adapted for the carrying on of the improved process and in which—

Figure 1 is a plan view of a cement making apparatus adapted for the practice of the invention. Fig. 2 is a view thereof in side elevation. Fig. 3 is a partial end elevation.

In this showing $a$ is a rock crusher of an ordinary type delivering crushed material into a suitable receptacle whence it is removed by conveyer $b$ and transferred to chute $b^1$, whence it passes through $b^2$ into a calcining kiln $c$. The calcining kiln is provided at its upper end with a dust chamber $c^1$ communicating with stack $c^2$. At the lower end this kiln is provided with a stationary housing $c^3$ of an ordinary type. A battery of gas producers $d$ communicating with gas line $d^1$ feeds gas burner $d^2$ passing through the housing and into the mouth of the kiln. The calcined material falls through the housing in the usual manner into cooler $e$ and thence into a calcines pit $e^1$. Air passing up through the cooler $e$ and through the housing, is heated by the calcines and serves to aid in the combustion of the fuel burning in the mouth of the kiln. The calcined material is removed by conveyer $f$ to regrinding means $f^1$. From the regrinding means, the fine material is taken by hopper $g$ and conveyers $h$ and $i$ into the upper end of a similar kiln $k$. At its upper end this kiln enters a dust chamber $k^1$ communicating with stack $k^2$. The calcined fine ground material passing down through $k$ is heated by a flame from gas burner $d^3$ entering through a stationary housing in the mouth of the kiln in the same manner as in the first kiln. The clinkered material passes downward through the housing into another cooler $l$ (shown in Fig. 1 in dotted lines and similar to the cooler shown in Fig. 2). Air passes up through this clinker cooler, aiding in the cooling of the clinker and the combustion of the gas flame in the mouth of the kiln.
In the operation with the described appa-
ratus the raw material, whether it be limestone, or cement rock, or a mixture of both, or any other cement making material in relatively large and hard masses, is first reduced to a coarsely crushed condition, as by the stone crusher $a$, so that it will be in suitable condition for subjection to the next step of the process and is then progressively calcined, by its passage through the rotary kiln $c$, to a degree sufficient to drive off moisture and carbonic acid gas and thereby to make it porous and friable. The crushing and the preliminary calcining are successive steps of a continuous process, the material passing in a continuous stream through the crushing means and immediately and continuously through the preliminary calcining means. In the apparatus shown in the drawings the material is continuously delivered from the crusher to the rotary kiln by the elevator $b$. The preliminary calcination is effected by flame from any suitable source such as the gas producer $d$, the flame being delivered into the remote and lower end of the kiln and the flame and flame gases acting upon the material progressively as it passes from the upper to the lower end. After the preliminary calcination the material is preferably cooled, as by passage through the cooler $e$ and is immediately and continuously reduced to a finely divided condition as by the mill $g$ to which, in the apparatus shown, the partially calcined material is delivered by the elevator $f$. By reason of the porous and friable condition of the calcined material, the regrinding is easily and quickly effected, with a mill of simple and inexpensive construction and with consumption of but little power. As the material is reduced to a finely divided condition it is immediately and progressively heated, as in the second rotary kiln $k$, to a degree sufficiently high to effect combination of the constituents or clinkering, the finely divided material from the regrinding mill $g$ being delivered to the second rotary kiln $k$, in the apparatus shown, by the conveyer $h$ and the elevator $i$. After clinkering the material is cooled, as in the cooler $l$, and is then pulverized or is stored as clinker to be pulverized later.

If the limestone and cement rocks, or other hard material, are not mixed before crushing and the first burning, they may be mixed immediately after the first burning, each material being progressively and partially calcined as above described, and the two materials being mixed after the partial calcination. If comparatively pure limestone rock and clay are the materials employed, the limestone rock is crushed and partially calcined as already described and the clay is then mixed with it, as at $f^1$.

The temperature maintained during the preliminary calcination, as already indicated, is merely sufficient to drive off all or nearly all of the carbonic acid gas and the moisture, being from 800° C. to 1000° C. according to the materials used. The individual firing means for this kiln permits suitable adjustments of thermal conditions within the kiln. The temperature maintained during the final burning is high enough to effect combination or clinkering, being usually from 1500° C. to 1800° C. according to the materials employed.

It is to be observed that the treatment to which the material is subjected throughout the process is continuous and progressive, each step or stage following immediately upon another, without intermission or manual handling of the materials.

By the practice of the improved process the materials are rendered friable before any fine grinding is required, so that the amount of mechanical power required to effect such grinding is enormously reduced, being only about ten per cent. of that required in the ordinary process of making cement. The power required for making an impalpable and uniform powder of such very hard materials as limestone and cement rock is very great. But upon calcining these materials they are cracked and shattered and are rendered intimately porous and friable by the expulsion of carbon dioxid throughout their mass and are then easily comminuted to any degree without a great expenditure of power. Furthermore, the carbonic acid gas is or may be completely driven off in the preliminary calcination, before the regrinding, so that it is not necessary to drive off carbonic acid gas in the secondary or final burning or clinkering. The reduction in the weight of the material required to be handled in the grinding is likewise considerable, the material required for the manufacture of one barrel of cement (380 pounds) by the old process being from 630 to 650 pounds, all of which must be carried through all the preliminary stages of drying, crushing and grinding, while the weight of calcined material necessary for the manufacture of one barrel of cement which must be fine-ground by the improved process is from 380 to 400 pounds, the handling of about one-third of the weight of material prior to fine grinding being thus avoided.

As the calcines leave the preliminary kiln, they are very hot and it is desirable to cool them down to enable the use of simple types of grinding mechanism. This cooling however is of course attended with a loss of heat which would militate against the economy of the process if it were not restored to the kiln. But by running the hot calcines through the rotary cooler $e$, air taken upward therethrough by the kiln draft at once cools such calcines and is itself heated, and, upon passing into the kiln aids in the combustion of the gas from $d^2$, restoring the heat absorbed from the calcines to the kiln.

It will be understood that the improved process herein described is independent of any particular form of mechanism, that illustrated in the accompanying drawings and referred to herein being merely a convenient form.

We claim as our invention:

1. The cement making process which comprises coarsely crushing raw cement material, continuously calcining said crushed material in a rotary kiln, cooling said calcined material in a rotary cooler and thereby heating a supply of air to aid combustion in said kiln, finely grinding and mixing said calcined material, continuously feeding the same through a rotary clinkering kiln, said kiln being heated to clinkering temperature by a producer gas flame moving in the opposite direction to the feed of material, and cooling the clinkered material in a rotary cooler and thereby heating a supply of air to aid combustion in said clinkering kiln.

2. The cement making process which comprises coarsely crushing raw cement material, continuously calcining said crushed material in a rotary kiln, cooling said calcined material and thereby heating air to aid in combustion in said kiln, finely grinding and mixing said calcined material, continuously feeding the same through a rotary clinkering kiln, said kiln being heated to a clinkering temperature by a heating flame moving in the opposite direction to the feed of material through said kiln and cooling the clinkered material and thereby heating air to aid in combustion in said clinkering kiln.

3. The cement making process which comprises coarsely crushing raw cement material, continuously calcining said crushed material in a rotary kiln and thereby rendering the said material porous and friable, cooling said calcined material and thereby heating air to aid in combustion in said kiln, finely grinding and mixing said calcined material, and thereupon continuously feeding the same through a rotary clinkering kiln, and heating said clinkering kiln to cement clinkering temperature by a fuel flame supported by preheated air.

4. The cement making process which comprises continuously calcining cement material in a rotary kiln heated to calcining temperature, grinding the calcined material and feeding said ground calcined material through a clinkering kiln heated to clinkering temperature by a heating flame supported by preheated air fed to said kiln.

5. The continuous process of making cement clinker comprising passing raw cement material through a primary rotary kiln, then pulverizing said materials, then passing said pulverized material through a secondary rotary kiln, and during the passage of the materials through said kilns in continuous succession, clinkering the pulverized material in the secondary kiln, and driving the carbon-dioxid from the raw material in the primary kiln.

6. The process of producing cement clinker which comprises crushing cement materials, calcining the same, cooling the calcines and restoring their heat to the calcining means, regrinding the cool calcines and clinkering the reground calcines.

7. The cement making process which comprises coarsely crushing cement material, passing the crushed material through a rotary kiln heated to calcining temperature and expelling carbon-dioxid from the crushed material in transit therethrough, then grinding the material and passing the ground material through a clinkering kiln heated to clinkering temperature.

8. The cement making process which comprises continuously calcining cement material in a rotary kiln heated to calcining temperature, grinding the calcined material and feeding said ground calcined material through a clinkering kiln heated to clinkering temperature.

9. The process of making cement clinker which comprises passing cement materials as a continuously traveling stream through a succession of rotary kiln sections, one such section being adapted for calcining and another for clinkering and diverting the stream intermediate such kiln sections through regrinding means.

10. The process of making cement clinker which comprises passing cement materials continuously through successively operating calcining, grinding and clinkering means as a traveling stream.

11. The process of making cement clinker which comprises passing cement materials as a continuously traveling stream through a plurality of independently fired rotary kiln sections, one of said kiln sections being maintained under thermal conditions appropriate for calcining and another under conditions appropriate for clinkering, and diverting said stream intermediate said kiln sections through regrinding means.

This specification signed and witnessed this twenty eighth day of September, A. D., 1906.

R. W. LESLEY.
HENRY S. SPACKMAN.

Signed in the presence of—
J. F. LENNIG,
WM. LOYD, Jr.